US012683369B2

(12) United States Patent
Nunez et al.

(10) Patent No.: US 12,683,369 B2
(45) Date of Patent: Jul. 14, 2026

(54) APPARATUS FOR POSITIONING AND RETAINING A CABLE-STYLED DEVICE AROUND AN OBJECT

(71) Applicant: UBICQUIA, INC., Fort Lauderdale, FL (US)

(72) Inventors: Cesar Eduardo Nunez, Miramar, FL (US); Claudio Santiago Ribeiro, Evanston, IL (US); Patrick Stuart Claeys, Weston, FL (US)

( * ) Notice: Subject to any disclaimer, the term of this patent is extended or adjusted under 35 U.S.C. 154(b) by 40 days.

(21) Appl. No.: 18/237,868

(22) Filed: Aug. 24, 2023

(65) Prior Publication Data

US 2023/0402825 A1     Dec. 14, 2023

Related U.S. Application Data

(63) Continuation-in-part of application No. 17/497,839, filed on Oct. 8, 2021, now Pat. No. 11,789,041.

(Continued)

(51) Int. Cl.
*H02G 3/04*          (2006.01)
*F16L 3/06*          (2006.01)

(52) U.S. Cl.
CPC .............. *H02G 3/0462* (2013.01); *F16L 3/06* (2013.01)

(58) Field of Classification Search
CPC ........ H02G 3/0462; H02G 3/32; H02G 11/00; F16L 3/06; F16L 3/1058; F16L 3/1083; G01R 15/181

(Continued)

(56) References Cited

U.S. PATENT DOCUMENTS 4,384,289 A     5/1983  Stillwell et al.
4,746,241 A     5/1988  Burbank, III
                        (Continued)

FOREIGN PATENT DOCUMENTS

DE      102021126730 A1     4/2022
EP           3657057 A1     5/2020
                        (Continued)

OTHER PUBLICATIONS

U.S. Patent & Trademark Office as International Searching Authority, International Search Report in connection with counterpart International Application No. PCT/US2023/031183, Jan. 12, 2024, 2 pages.

(Continued)

*Primary Examiner* — Arleen M Vazquez
*Assistant Examiner* — Robert P Alejnikov, Jr.
(74) *Attorney, Agent, or Firm* — Daniel C. Crilly

(57)          ABSTRACT

An apparatus for positioning and retaining a cable-styled device around an object includes a first member and a second member that are movable relative to each other. The first member includes a hinge element defining an opening proximate a first end of the first member, a hinge pin positioned within the opening, and a first retention element configured to receive a first section of the cable-styled device. The second member includes a generally hook-shaped element positioned at a first end of the second member and a second retention element configured to receive a second section of the cable-styled device. The hook-shaped element engages the hinge pin within the opening of the hinge element and is constructed to maintain engagement with the hinge pin when the first member and the second member are in an open position relative to each other.

20 Claims, 7 Drawing Sheets

Related U.S. Application Data

(60) Provisional application No. 63/401,092, filed on Aug. 25, 2022, provisional application No. 63/400,785, filed on Aug. 25, 2022, provisional application No. 63/089,480, filed on Oct. 8, 2020.

(58) Field of Classification Search
USPC .......................................................... 324/127
See application file for complete search history.

(56) References Cited

U.S. PATENT DOCUMENTS

| | | | |
|---|---|---|---|
| 4,794,328 A | 12/1988 | Fernandes et al. | |
| 4,796,027 A | 1/1989 | Smith-Vaniz | |
| 4,801,937 A | 1/1989 | Fernandes | |
| 5,683,117 A | 11/1997 | Corbett et al. | |
| 6,624,624 B1 | 9/2003 | Karrer et al. | |
| 7,230,413 B2 | 6/2007 | Zhang et al. | |
| 9,267,970 B2 | 2/2016 | Moreux et al. | |
| 9,588,148 B2 | 3/2017 | Cook et al. | |
| 9,607,749 B2 | 3/2017 | Cook et al. | |
| 10,054,615 B2 | 8/2018 | Schneider et al. | |
| 11,067,455 B2 | 7/2021 | Yuan et al. | |
| 11,581,720 B2 * | 2/2023 | Daude .................. | F16B 5/0685 |
| 11,789,041 B2 | 10/2023 | Ribeiro et al. | |
| 12,174,223 B2 | 12/2024 | Penttonen et al. | |
| 2001/0012722 A1 | 8/2001 | Adams | |
| 2008/0035801 A1 | 2/2008 | Adams et al. | |
| 2012/0256617 A1 | 10/2012 | Moreux et al. | |
| 2014/0374544 A1 | 12/2014 | Pearson et al. | |
| 2015/0008903 A1 * | 1/2015 | Javora ..................... | G01R 1/22 |
| | | | 29/595 |
| 2015/0214709 A1 | 7/2015 | Landry et al. | |
| 2016/0025244 A1 * | 1/2016 | Tally ....................... | H02G 3/32 |
| | | | 29/428 |
| 2016/0041204 A1 | 2/2016 | Bietz et al. | |
| 2016/0055963 A1 | 2/2016 | Lockstedt et al. | |
| 2016/0111864 A1 * | 4/2016 | Duncan ................... | H02G 3/32 |
| | | | 174/79 |
| 2016/0129854 A1 | 5/2016 | Bachelder et al. | |
| 2017/0176501 A1 | 6/2017 | Schneider et al. | |
| 2017/0363661 A1 * | 12/2017 | Rodriguez, Jr. ... | G01R 19/0092 |
| 2020/0207279 A1 | 7/2020 | Kulick | |
| 2020/0408334 A1 | 12/2020 | Proulx et al. | |
| 2021/0033220 A1 | 2/2021 | Laughlin et al. | |
| 2022/0113337 A1 | 4/2022 | Ribeiro et al. | |

FOREIGN PATENT DOCUMENTS

| | | | | |
|---|---|---|---|---|
| KR | 10-1468887 B1 | | 12/2014 | |
| KR | 10-1707152 B1 | | 2/2017 | |
| KR | 101895719 B1 | * | 9/2018 | ......... G01R 1/06794 |
| WO | WO-9710515 A1 | * | 3/1997 | .......... G01R 15/181 |
| WO | 2009139521 A1 | | 11/2009 | |
| WO | 2022018326 A1 | | 1/2022 | |

OTHER PUBLICATIONS

U.S. Patent & Trademark Office as International Searching Authority, Written Opinion of the International Searching Authority in connection with counterpart International Application No. PCT/US2023/031183, Jan. 12, 2024, 7 pages.

Echo Engineering, "Engineering Design—Plastic Clips & Fasteners," website (online), Apr. 2, 2020 [Retrieved on Dec. 7, 2023], Retrieved from the internet, URL: https://www.echosupply.com/blog/engineering-design-plastic-clips-and-fasteners/, 3 pages.

Custompart.net, "Injection Molding," website (online), 2007 [Retrieved on Aug. 1, 2024], Retrieved from the internet, URL: https://www.custompartnet.com/wu/InjectionMolding, 12 pages.

* cited by examiner

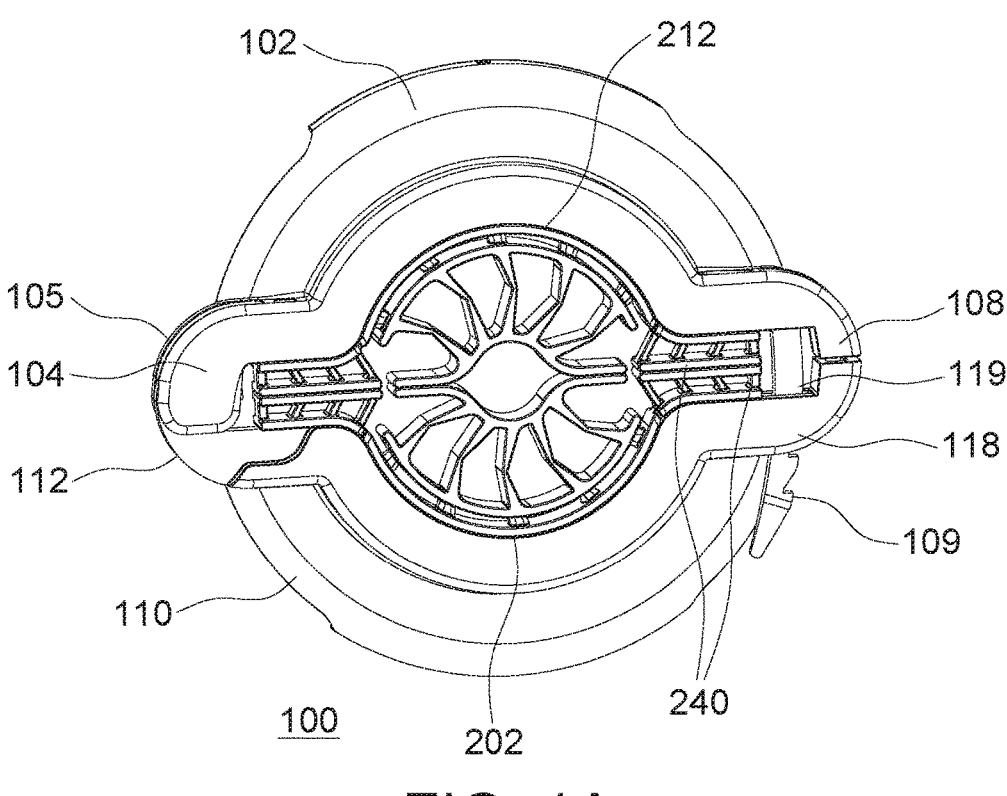
FIG. 1A
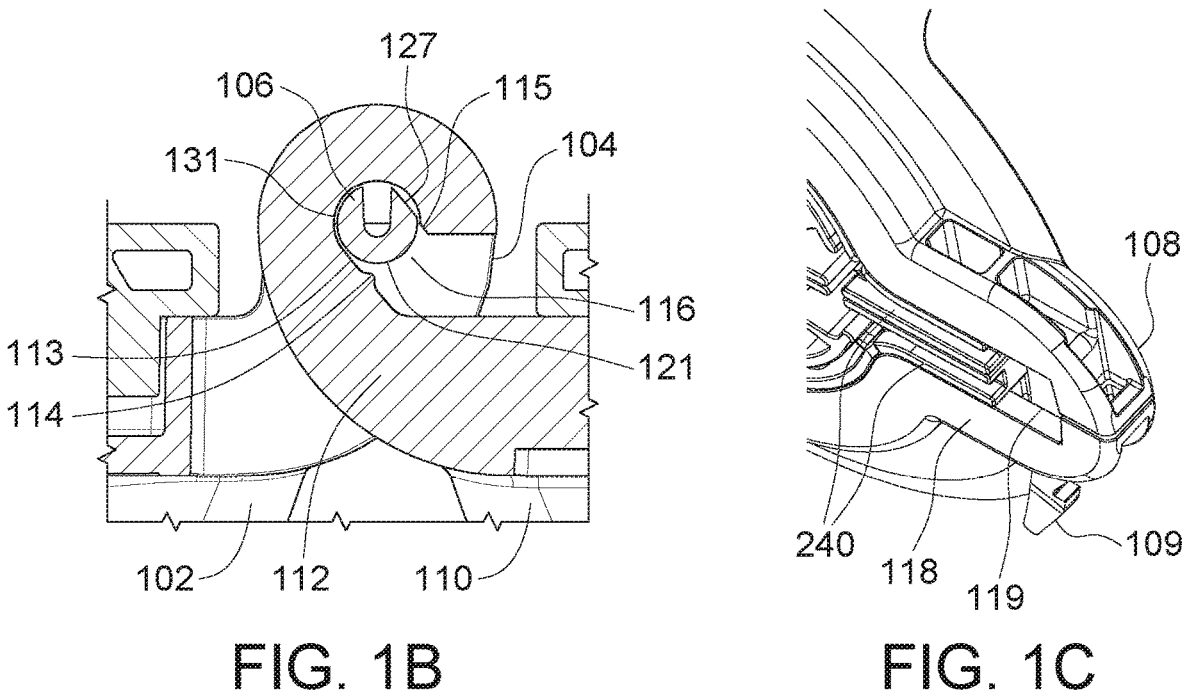
FIG. 1B
FIG. 1C 413
412
411
440
420
410
401
402
407
403

400

513
520
512
530
211
540
502
201
503
507

500

602

603

607

600

702

703

707

700

802

803

807

800

APPARATUS FOR POSITIONING AND RETAINING A CABLE-STYLED DEVICE AROUND AN OBJECT

CROSS-REFERENCE TO RELATED APPLICATIONS

The present application is a continuation-in-part of U.S. application Ser. No. 17/497,839, which was filed on Oct. 8, 2021, and is incorporated herein by this reference as if fully set forth herein. The present application also claims the benefit of and priority upon U.S. Provisional Patent Application No. 63/401,092, which was filed on Aug. 25, 2022, and is incorporated herein by this reference as if fully set forth herein. The present application further claims the benefit of and priority upon U.S. Provisional Patent Application No. 63/400,785, which was filed on Aug. 25, 2022, and is incorporated herein by this reference as if fully set forth herein. U.S. application Ser. No. 17/497,839 claims the benefit of and priority upon U.S. Provisional Patent Application No. 63/089,480, which was filed on Oct. 8, 2020, and is incorporated herein by this reference as if fully set forth herein.

TECHNICAL FIELD

The present disclosure relates generally to positioning and retaining devices. More particularly, but not exclusively, the present disclosure relates to an apparatus for positioning and retaining a cable-styled device, such as a coaxial cable, a power cable, or a Rogowski coil, around an object.

BACKGROUND

As is known, many different types of electronic devices use cables or wires for various purposes. In some instances, the cable location or positioning can significantly alter the functionality of the electronic devices themselves or the monitoring of such devices. The ease of access for installation, repair, or removal of such cables can also become an issue for workers in the field, especially in outdoor or aerial environments. Furthermore, mounting such cables can be difficult for installers as they may require multiple tools for installation.

Some types of electronic devices, such as transformer monitors, may use or be attached to one or more Rogowski coils to monitor the operation of distribution or other power transformers. The positioning of the Rogowski coils relative to the primary or secondary power lines or their associated transformer bushings can affect the accuracy of current measurements made based on the outputs from the Rogowski coils. To obtain the most accurate results, the center of conductor with which a Rogowski coil is used should be concentric with the center of the Rogowski coil.

However, maintaining concentricity of the conductor and the Rogowski coil can be difficult depending on the construction of the Rogowski coil, the geometry of the transformer bushing, and the location of the conductor to be sensed. Furthermore, in instances where there are many cables involved and limited space, an efficient and stable cable-styled device mounting method and associated positioning and retaining apparatus can improve overall installation, operation, and performance of electronic devices that rely upon proper positioning of the cable-styled devices.

All of the subject matter discussed in the Background section is not necessarily prior art and should not be assumed to be prior art merely as a result of its discussion in the Background section. For example, any recognition of problems in the prior art discussed in the Background section or associated with such subject matter should not be treated as prior art unless expressly stated to be prior art.

SUMMARY

In some embodiments, a positioning and retaining apparatus for a cable-styled device, such as a Rogowski coil, a coaxial cable, or a power cable, includes a first member having a first retention element and a hinge pin, and a second member having a second retention element and a generally hook-shaped feature (e.g., arm or other element) arranged and constructed to engage with the hinge pin to prevent the first and second members from separating when they are in an open position relative to each other. The hinge pin is positioned within a hook retention channel of the first member and the hook-shaped element engages the hinge pin within the hook retention channel.

In some embodiments, the first member of the positioning and retaining apparatus may define or include a first insert channel configured for receiving at least a portion of a first insert element. In some embodiments, the second member of the positioning and retaining apparatus may include a second insert channel configured for receiving at least a portion of a second insert element. The first and second insert elements may be individual inserts or collectively form a single insert. Each insert element may be pliable to accommodate and retain objects, such as, for example, power transformer bushings or transformer spade connectors or terminals, of various geometries. Each insert element may also be non-conductive, especially where the apparatus is used to position and retain a Rogowski coil around a transformer bushing, a transformer spade connector or terminal, or a power line.

In some embodiments, the first member and/or the second member of the positioning and retaining apparatus may include an alignment aperture for aligning a portion of the respective insert element within the member's insert channel. In such a case, the insert element may include an alignment member, such as a tab, post, or other protrusion, sized and shaped to mate with the alignment aperture.

In further embodiments, each insert element of the positioning and retaining apparatus may be an apparatus that includes a base member coupled on one side to one or more pliable retention members and coupled on another side to one or more coupling members configured for coupling to the applicable positioning and retaining apparatus member. The retention members extend outwardly (e.g., laterally) from the base member and are configured to facilitate engagement with the object irrespective of the object's geometry. The one or more coupling members may be or include a spine member or one or more tabs, posts, or other protrusions and may be sized and shaped to be insertable into an insert channel of an associated positioning and retaining apparatus member. In one exemplary embodiment, the first and second insert elements are identical. Alternatively, the first and second insert elements may have differing configurations for their base, retention, and/or coupling members.

In further embodiments, the base member of the insert element may be substantially arch-shaped or otherwise shaped (e.g., C-shaped, block or square C-shaped, J-shaped, U-shaped, and so forth) to accommodate and retain objects of various geometries. In a still further embodiment, the retention members of the insert element may be radially extending, such as where the base member is substantially arch-shaped. Still further, the coupling member of each insert element may be pliable, especially when fabricated as an injection molded silicone component together with the other members of the insert element.

In other embodiments, the retention members of the first and second insert elements are sufficiently pliable to accommodate objects, such as transformer bushings, cables, or conductors, of various geometries. In further embodiments, sections of the insert elements are removable (e.g., cut-away or break away) to accommodate objects of larger or irregular geometries, such as transformer spade connectors or terminals.

In some embodiments, each insert element may further include an alignment member, such as a pin or stud, sized and shaped to mate with an alignment recess or well in the corresponding positioning and retaining apparatus member thereby enabling alignment between the insert element and its associate positioning and retaining apparatus member.

In some embodiments, the pliable retention members of one or both insert elements may have a wide variety of shapes and forms. For example, the retention members of one or both insert elements may form a honeycomb shape. In other embodiments, the retention members of one or both insert elements may be or form a plurality of trusses. In further embodiments, the retention members of one or both insert elements may be or form a plurality of bent trusses. In yet other embodiments, the retention members of one or both insert elements may form a plurality of diamond-shaped trusses. The retention members may be fabricated from silicone, rubber, or other resilient yet flexible materials to achieve their pliability.

In some embodiments, each insert element may be fabricated separately (e.g., as a separate injection molded part). In other embodiments, the two insert elements may be fabricated as a single unit (e.g., as a single injection molded part with removable (e.g., break-away or cut-away) members, such as posts or tabs, to enable separation of the insert elements).

In other embodiments, each insert element of the positioning and retaining apparatus may be an apparatus that includes a base member, one or more pliable retention members coupled to a first side of the base member, and one or more pliable coupling members coupled to a second side of the base member. The coupling member(s) may be configured for coupling to the retaining apparatus member. For example, the coupling member may be sized and shaped to be insertable into an insert channel of a positioning and retaining apparatus member with which the insert element is or will be used.

In further embodiments, the hinge pin of the positioning and retaining apparatus' first member may include a substantially flat surface area on a radial portion of the hinge pin, which creates a snap feature together with a substantially flat surface area on an inner radial portion of the hook-shaped element of the positioning and retaining apparatus' second member.

In other embodiments, the positioning and retaining apparatus may further include an adjustable fastening mechanism formed collectively by the first member and the second member proximate a second end of the first member and a second end of the second member to retain the first member and the second member in a closed position around the object. The second ends of the first and second members may be on opposite sides of the first and second members from their first ends. In some embodiments, the adjustable fastening member may be a ratchet-style clamp or zip-tie clamp.

In alternative embodiments, a positioning and retaining apparatus for a cable-styled device includes a first member having a first retention element and a hinge pin that includes a substantially flat surface area on a radial portion of the hinge pin, and a second member having a second retention element and a generally hook-shaped element arranged and constructed to engage with the hinge pin to prevent the first member from separating from the second member in an open position. The second member's hook-shaped element may further include a substantially flat surface area on an inner radial portion of the hook-shaped element, where the substantially flat surface area of the hook-shaped element and the substantially flat surface area of the hinge pin form a snap feature upon rotation to a closed position between the first member and the second member. Additionally, in some embodiments, a radially inner surface of the hook-shaped element includes a protrusion adjacent to the substantially flat surface area and may further include a flat or tapered corner opposing the protrusion to enable a one-way insertion of the hook-shaped element upon the hinge pin.

In some exemplary embodiments, the first member and the second member may be non-conductive and optionally made of a hard insulating material. In other embodiments, the first retention element and the second retention element may be configured for retaining a Rogowski coil. In further embodiments, the first retention element and the second retention element may be configured to maintain a Rogowski coil in a substantially circular configuration when the positioning and retaining apparatus is closed.

In a further exemplary embodiment, an apparatus for positioning and retaining a cable-styled device around an object includes a first member and a second member. The first member includes a hinge element defining an opening proximate a first end of the first member, a hinge pin positioned within the opening, and a first retention element configured to receive a first section of the cable-styled device. The second member includes a generally hook-shaped element positioned at a first end of the second member and a second retention element configured to receive a second section of the cable-styled device. The hook-shaped element engages the hinge pin within the opening of the hinge element and is constructed to maintain engagement with the hinge pin when the first member and the second member are in an open position relative to each other. For example, the hook-shaped element may define a gap that receives the hinge pin. The first and second members may be entirely non-conductive, or portions of the members may be non-conductive, such as the retention elements.

In another exemplary embodiment, the hook-shaped element may include a protrusion in a direction toward the hinge pin to enable the hook-shaped element to maintain engagement with the hinge pin when the first member and the second member are in the open position. Additionally, the hinge pin may include a first substantially flat section on a radial portion thereof and the hook-shaped element may include a second substantially flat section on an inner radial portion thereof adjacent the protrusion. In such a case, the substantially flat sections of the hinge pin and the hook-shaped element enable a one-way engagement of the hook-shaped element with the hinge pin.

In yet another exemplary embodiment, the positioning and retaining apparatus may further include a securing structure configured to engage the object and retain the first member and the second member in fixed positions relative to the object and to each other when the first member and the second member are in a closed position relative to each other. The securing structure may be fully or partially pliable and non-conductive. For example, the securing structure may have sufficient flexibility to accommodate and retain the first member and the second member in fixed positions relative to the object irrespective of the object's geometry.

According to one exemplary embodiment, the securing structure may include a first insert element and a second insert element. In such a case, the first insert element may be configured to engage the object and retain the first member in a fixed position relative to the object, and the second insert element may be configured to engage the object and retain the second member in a fixed position relative to the object. At least a portion of the first insert element (e.g., a retention member, such as a spine member, one or more posts, tabs, or other protrusions, or so forth) may be positioned in a first insert channel defined by the first member. Similarly, at least a portion of the second insert element may be positioned in a second insert channel defined by the second member. The insert elements may be fully or partially pliable and non-conductive.

According to another exemplary embodiment, the securing structure may be an insert apparatus including a first insert element, a second insert element, and at least one removable member connecting the first insert element and the second insert element to facilitate fabrication of the first insert element and the second insert element as a single injection molded part. In this case, each insert element includes a respective base member, a set of one or more retention members coupled to a first side of the base member, and a respective set of one or more coupling members coupled to a second side of the first base member. Each set of retention members extends outwardly from its respective base member and is configured to facilitate engagement of an object irrespective of the object's geometry. Each set of coupling members is configured for coupling to a respective part or member of the positioning and retaining device.

According to a further exemplary embodiment, the positioning and retaining apparatus may also or alternatively include an adjustable fastening mechanism formed collectively by the first member and the second member proximate a second end of the first member and a second end of the second member to retain the first member and the second member in a closed position, such as around the object. The adjustable fastening mechanism may be a ratchet-style clamping mechanism, zip-tie clamp, a latch, or other conventional or future-developed fastening mechanism.

According to yet another exemplary embodiment, an apparatus for positioning and retaining a cable-styled device around an object includes a first member, a second member, a first substantially pliable insert element, a second substantially pliable insert element, and a securing structure. The first member includes a hinge element defining an opening proximate a first end of the first member, a hinge pin positioned within the opening, and a first retention element configured to receive a first section of the cable-styled device. The second member includes a generally hook-shaped element positioned at a first end of the second body and a second retention element configured to receive a second section of the cable-styled device. The first member and the second member are movable relative to each other. The first insert element is configured to engage the object and retain the first member in a fixed position relative to the object. The second insert element is configured to engage the object and retain the second member in a fixed position relative to the object. The second member's hook-shaped element is positioned within the opening of the first member's hinge element and defines a gap that receives the hinge pin. The hooked-shaped element and the hinge pin are preferably but not necessarily shaped to prevent the hooked-shaped element from separating from the hinge pin when the first member and the second member are in an open position relative to each other. At least a portion of the first insert element may be positioned in a first insert channel defined by the first member, and at least a portion of the second insert element may be similarly positioned in a second insert channel defined by the second member.

BRIEF DESCRIPTION OF THE DRAWINGS

Non-limiting and non-exhaustive exemplary embodiments are described with reference to the following drawings, wherein like reference numerals refer to like components or elements throughout the various views, unless otherwise specified. The sizes and relative positions of elements in the drawings are not necessarily drawn to scale. For example, the shapes of various elements are selected, enlarged, and positioned to improve drawing legibility. The particular shapes of the elements have been selected for ease of recognition in the drawings.

FIG. 1A illustrates a front perspective view of an apparatus for positioning and retaining a cable-styled device around an object in accordance with one exemplary embodiment of the present disclosure.

FIG. 1B illustrates an enlarged, cross-sectional view of the hinge mechanism of the exemplary positioning and retaining apparatus of FIG. 1A, in accordance with the present disclosure.

FIG. 1C illustrates an enlarged view of an adjustable fastening mechanism of the exemplary positioning and retaining apparatus of FIG. 1A, in accordance with the present disclosure.

DETAILED DESCRIPTION

Figure 2A:
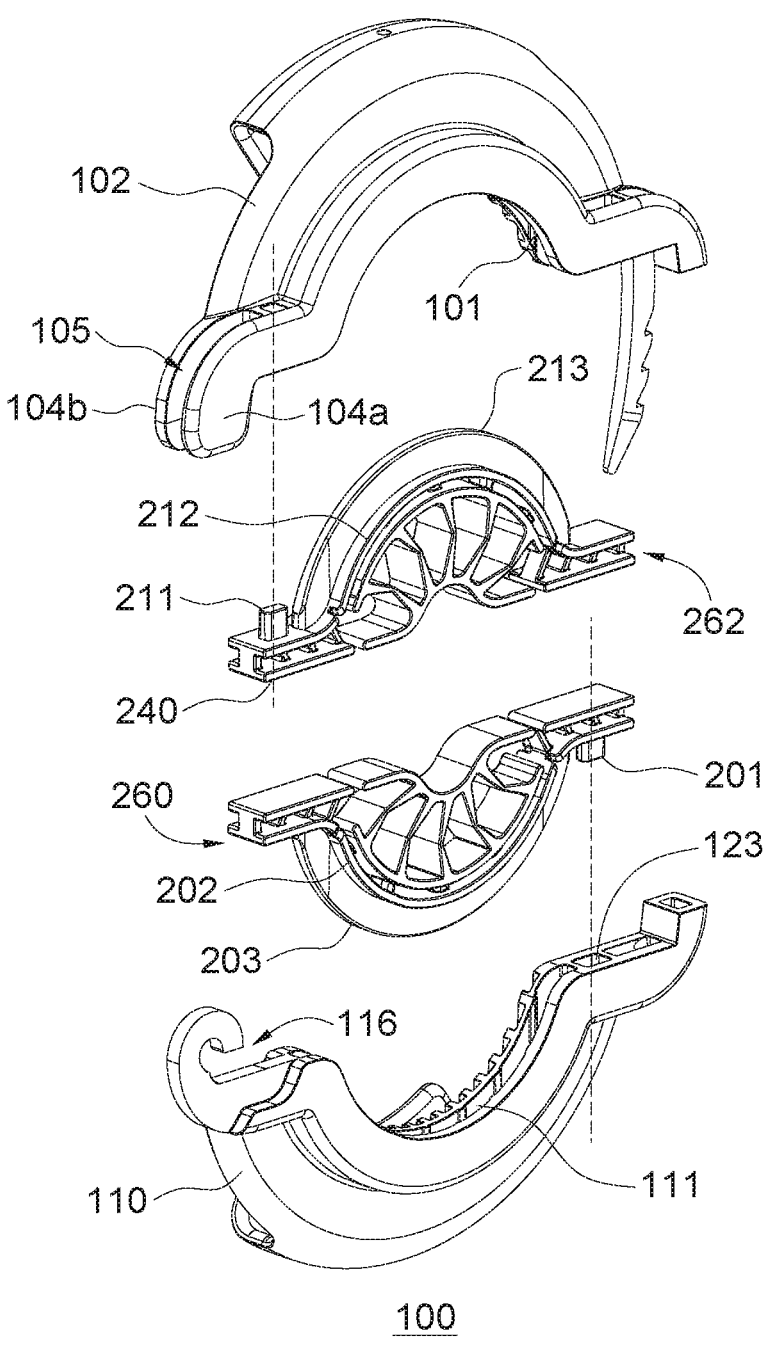
FIG. 2A illustrates a front, left side, perspective, exploded view of the exemplary positioning and retaining apparatus of FIG. 1A, in accordance with the present disclosure.

In the following description, certain specific details are provided to facilitate a thorough understanding of various disclosed exemplary embodiments. However, one skilled in the relevant art will recognize that the disclosed embodiments may be practiced without one or more of these specific details, or with other methods, components, materials, etc. Also, in these instances, well-known structures may be omitted or shown and described in reduced detail to avoid unnecessarily obscuring descriptions of the various exemplary embodiments.

In some exemplary embodiments as illustrated in FIGS. 1A-1C, 2A-2C, and 3A-3B, an apparatus 100 for positioning and retaining a cable-styled device around an object 304 includes at least two cooperating members 102, 110. One retaining apparatus member 102 includes a hinge element defining an opening 105 proximate one end of the member 102, a hinge pin 106 positioned within the opening 105, such as between a pair of hinge element components (e.g., hinge arms 104a, 104b), and a retention element 107 configured to receive a section of the cable-styled device, such as a Rogowski coil, a coaxial cable, or a power cable. Another retaining apparatus member 110 includes a generally hook-shaped element 112 positioned at a first end of the member 110 and a second retention element 117 configured to receive a second section of the cable-styled device. As illustrated in exemplary form in the cross-sectional view of FIG. 1i, the hook-shaped element 112 engages the hinge pin 106 within the opening 105 of the hinge element. The hook-shaped element 112 is constructed to maintain engagement with the hinge pin 106 when the two retaining apparatus members 102, 110 are in an open position relative to each other.

In some embodiments, one or both retaining apparatus members 102, 110 may include a respective securing structure configured to engage the object (e.g., a transformer bushing or other object) and retain the retaining apparatus members 102, 110 in fixed positions relative to the object and to each other when the retaining apparatus members 102, 110 are in a closed position relative to each other. The securing structure may be one or more insert elements coupled to the retaining apparatus members 102, 110. For example, the securing structure may be a set of insert elements 260, 262, with each insert element 260, 262 being configured to engage the object and retain its respective retaining apparatus member 102, 110 in a fixed position relative to the object. The securing structure may have sufficient flexibility to accommodate and retain the retaining apparatus members 102, 110 in fixed positions relative to the object irrespective of the object's geometry.

In some embodiments, one retaining apparatus member 102 of the positioning and retaining apparatus 100 may further include an insert slot channel 101 configured for receiving its respective insert element 262. In such embodiments, the other retaining apparatus member 110 of the positioning and retaining apparatus 100 may also include an insert slot channel 111 configured for receiving its respective insert element 260.

In embodiments in which one or more of the retaining apparatus members 102, 110 includes a respective insert channel 101, 111, the insert element 260, 262 may include a base member, one or more retention members, and one or more coupling members. The retention member or members are coupled to one side of the base member, pliable, extend outwardly from the base member (e.g., laterally or radially depending on the geometry of the base member), and are configured to facilitate engagement of an object irrespective of a geometry of the object. The coupling member or members may be a spine member or a set of tabs, posts, or other protrusions coupled to another (e.g., opposite) side of the base member and sized and shaped to be insertable into the respective retaining apparatus member's insert channel 101, 111.

Figure 2B:
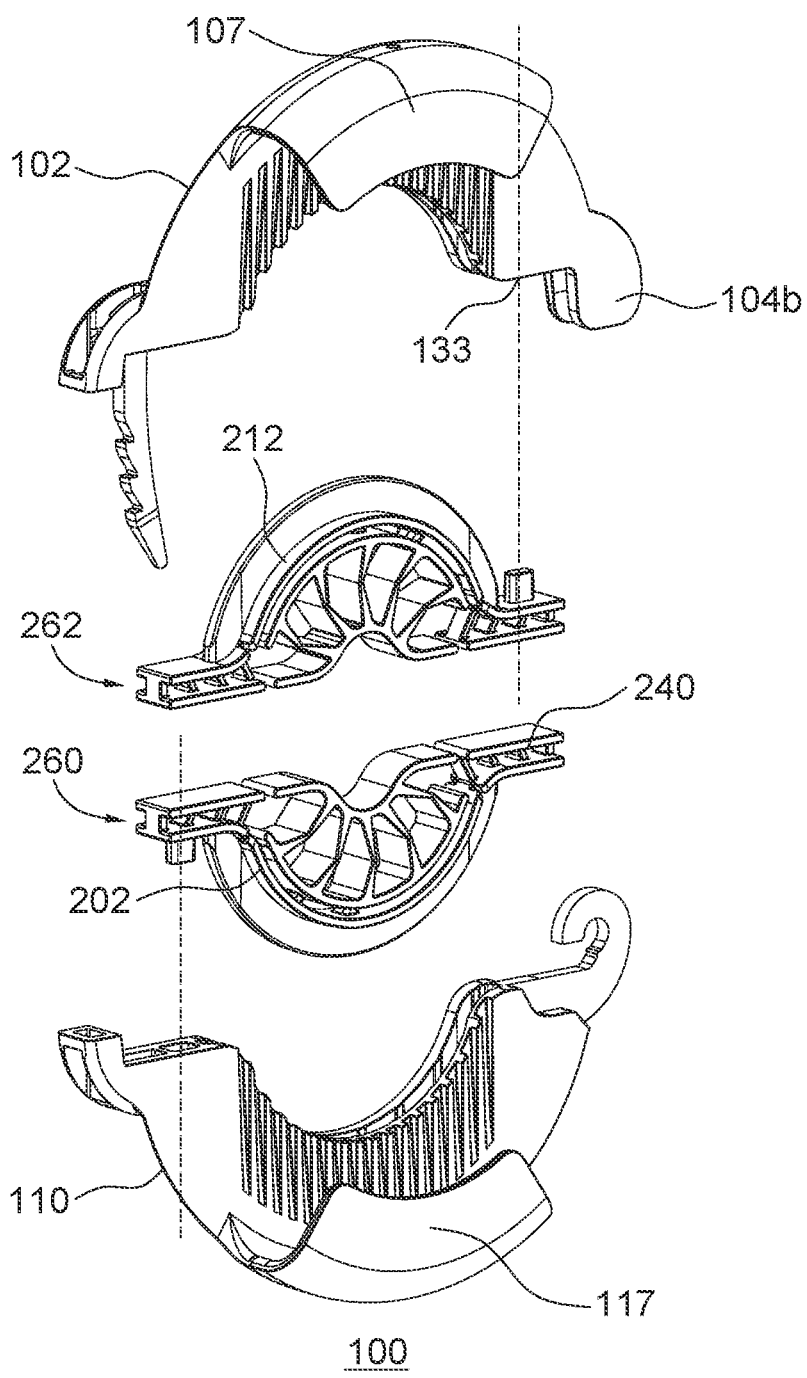
FIG. 2B illustrates a rear, right side, perspective, exploded view of the exemplary positioning and retaining apparatus of FIG. 1A, in accordance with the present disclosure.
Figure 2C:
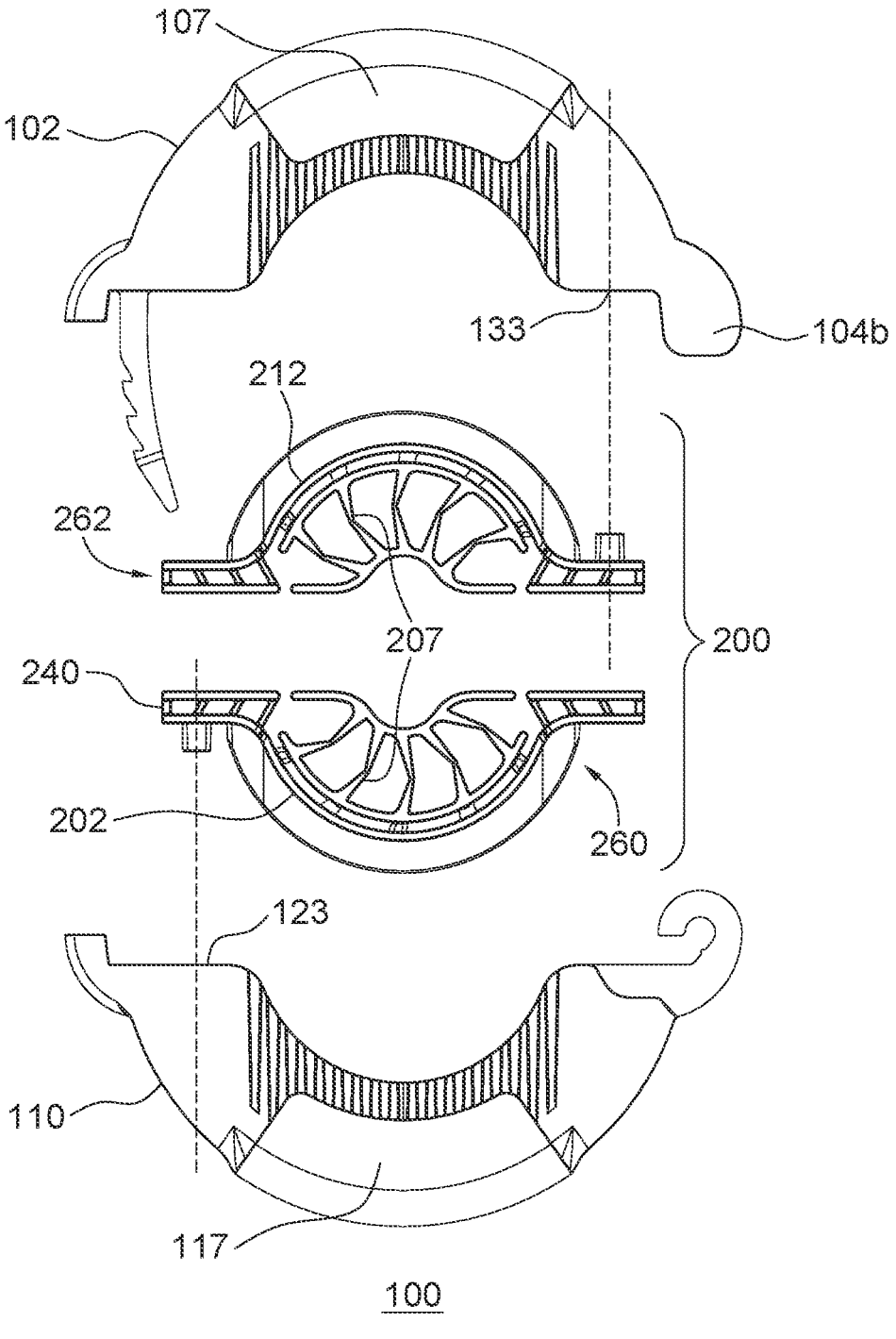
FIG. 2C illustrates a rear, plan, exploded view of the exemplary positioning and retaining apparatus of FIG. 1A, in accordance with the present disclosure.

For example, as illustrated in FIGS. 2A-2C, insert element 260 may include a base member 202, a set of retention members 207, and a spine-styled coupling member 203. The illustrated coupling member 203 is insertable into the insert channel 111 of retaining apparatus member 110. Similarly, insert element 262 may include a base member 212, a set of retention members 207, and a spine-styled coupling member 213. This coupling member 213 is insertable into the insert channel 101 of retaining apparatus member 102.

In the exemplary embodiment, the base member 202, 212 of each insert element 260, 262 is substantially arch-shaped and each set of retention members 207 extends radially outward from its respective base member 202, 212. Where the base member 202, 212 is not arch-shaped, the set of retention members 207 may extend laterally but not necessarily radially outward from its respective base member 202, 212.

In a further embodiment, the insert element 260, 262 may include one or more removable sections 240 to accommodate objects of larger or irregular geometries. Such section or sections 240 may be break-away or cut-away sections. The insert element 260, 262 may also or alternatively include an alignment member 201, 211 sized and shaped to mate with an alignment well or aperture 123, 133 of the retaining apparatus member 102, 110.

To attain pliability, the insert element 260, 262 or at least the retention members 207 thereof may be formed from silicone or rubber and be optionally injection molded. According to one preferred embodiment, the entire insert element 260, 262, including base member 202, 212, retention members 207, and coupling member(s) 203, 213, is pliable. In an alternative embodiment, the retention members 207 and the coupling member(s) 203, 213 may be pliable but the base member 202, 212 may be rigid.

In alternative embodiments, one or more retaining apparatus members 102, 110 of the positioning and retaining apparatus 100 may exclude a respective insert slot channel 101, 111. In such a case, the member's associated insert element 260, 262 may accordingly exclude its coupling member 203, 213. For these embodiments, the base member 202, 212 of the insert element 260, 262 may be attached to the inner surface of its associated retaining apparatus member 102, 110 using an adhesive, such as an epoxy, or using one or more fasteners, such as pins or screws.

In some embodiments, the insert elements 260, 262 are configured to accommodate and retain objects, such as power transformer bushings or transformer spade connectors or terminals of various geometries. Various geometries can mean not only various shapes or volumes, but also of various sizes. In some embodiments, the insert elements 260, 262 can be configured to retain wires, cables, or wire strands of various gauges or diameters.

In some embodiments, retaining apparatus member 102, retaining apparatus member 110, or both retaining apparatus members 102, 110 include at least an alignment aperture 123, 133 for aligning at least the insert element 260, 262 within the insert slot channel 101, 111 of the respective retaining apparatus member 102, 110 using an alignment member 201, 211 (e.g., a protrusion) of the insert element 260, 262 that mates with the respective alignment aperture 123, 133 as shown in FIGS. 2A, 2B, and 2C.

In some embodiments as shown in FIG. 1B, the hinge pin 106 includes a flat section 127 on a radial portion 121 of the hinge pin 106 that creates a snap feature with a first substantially flat section 113 on an inner radial portion 131 of the hook-shaped element 112 of retaining apparatus member 110.

In some embodiments, the positioning and retaining apparatus 100 is configured to only allow a one-way entry of the hook-shaped element 112 into the opening 105 of the hinge element of retaining apparatus member 102, where the hinge pin 106 is positioned as shown in FIG. 1B. Each of retaining apparatus member 102 and retaining apparatus member 110 can be made of a unitary piece of material or can be formed with multiple portions such as a clam shell arrangement so that retaining apparatus member 102 is made of two or more mating pieces and retaining apparatus member 110 is made of two or more mating pieces. In any event, once the retaining apparatus members 102, 110 are formed, they may be joined together by positioning the hook-shaped element 112 of retaining apparatus member 110 into the opening 105 of the hinge element and onto the hinge pin 106 of retaining apparatus member 102 such that the flat section 127 on the radial portion 121 of the hinge pin 106 fits into an entry gap 116 defined by the hook-shaped element 112 of retaining apparatus member 110 with a protrusion 114 of the hook-shaped element 112 (located adjacent to a first flat section 113 of the hook-shaped element 112) on one side of the entry gap 116 and a second flat section 115 of the hook-shaped element 112 on the other side of the entry gap 116. The joinder may be a one-time event or at least a difficult event to undo because of the configuration having the flat section 127 on the radial portion 121 of the hinge pin 106 fitting into the entry gap 116 of the hook-shaped element 112 with the protrusion 114 on one side of the entry gap 116 and the second flat section 115 of the hook-shaped element 112 on the other side of the entry gap 116. The second flat second 115 of the hook-shaped element 112 may slide across the flat section 127 of the hinge pin 106 when opening and closing the apparatus 100, but a flat portion of the hinge element and the protrusion 114 of the hook-shaped element 112 may serve as a stop mechanism for further rotation beyond a certain point in one direction (e.g., where the flat portion of the hinge element meets the radial portion 121 of the hinge pin 106) or the other (e.g., where the protrusion 114 and the first flat section 113 of the hook-shaped element 112 mate or engage the flat section 127 of the hinge pin 106).

In some embodiments, retaining apparatus member 102 of the positioning and retaining apparatus 100 further includes an adjustable fastening mechanism 109 formed to pass through apertures in respective arms 108, 118 of the retaining apparatus member 102 and retaining apparatus member 110 on a side opposite the hinge pin 106 and the hook-shaped element 112. In some embodiments, the adjustable fastening mechanism 109 is a ratchet-style clamp or zip-tie clamp. Such a ratchet-style clamp can include ratcheting member that ratchets through an aperture 119 in the arm 118 of retaining apparatus member 110. The adjustable fastening mechanism 109 can be an integrated portion of the arm 108 of retaining apparatus member 102 as shown in FIGS. 1A and 1C.

In some embodiments, a positioning and retaining apparatus 100 includes a first retaining apparatus member 102 having a first retention element 107 and a hinge pin 106 that includes a flat section 127 on a radial portion 121 of the hinge pin 106, and a second retaining apparatus member 110 having a second retention element 117 and a hook-shaped element 112 arranged and constructed to engage with the hinge pin 106 and prevent the first retaining apparatus member 102 from separating from the second retaining apparatus member 110 in an open position. The positioning and retaining apparatus 100 as shown in FIG. 1B further includes a substantially flat section 113 on an inner radial portion 131 of the hook-shaped element 112, where the substantially flat section 113 of the hook-shaped element 112 and the flat section 127 of the hinge pin 106 form a snap feature upon rotation to a closed position between the first retaining apparatus member 102 and the second retaining apparatus member 110.

In some embodiments, an entry gap 116 of the hook-shaped element 112 is further constructed and configured to include a protrusion 114 adjacent to one substantially flat section 113 of the hook-shaped element 112 and another flat section 115 (e.g., a flat corner) opposite the entry gap 116 from the protrusion 114 to enable a one-way insertion of the hook-shaped element 112 upon the hinge pin 106 as previously noted above.

In some embodiments, the hinge pin 106 resides within an opening 105 of the hinge element of retaining apparatus member 102 and where the hook-shaped element 112 of retaining apparatus member 110 engages the hinge pin 106 in the opening 105 of the hinge element of retaining apparatus member 102.

In some embodiments, the positioning and retaining apparatus 100 further includes a first insert slot channel 101 in retaining apparatus member 102 configured for receiving a first insert element 262 and a second insert slot channel 111 in retaining apparatus member 110 configured for receiving a second insert element 260 as shown in FIGS. 2A and 2B. In some embodiments, the positioning and retaining apparatus 100 includes the first insert slot channel 101 in retaining apparatus member 102 and the second insert slot channel 111 in retaining apparatus member 110 configured for receiving and retaining at least a respective insert element 262, 260. In other words, in some embodiments the insert slot channels 101, 111 in the retaining apparatus members 102, 110 can separately receive their own respective insert elements 262, 260 or in other embodiments they could receive a single unitary insert that can be retained by either the first insert slot channel 101, the second insert slot channel 111, or both insert slot channels 101, 111.

Figure 3A:
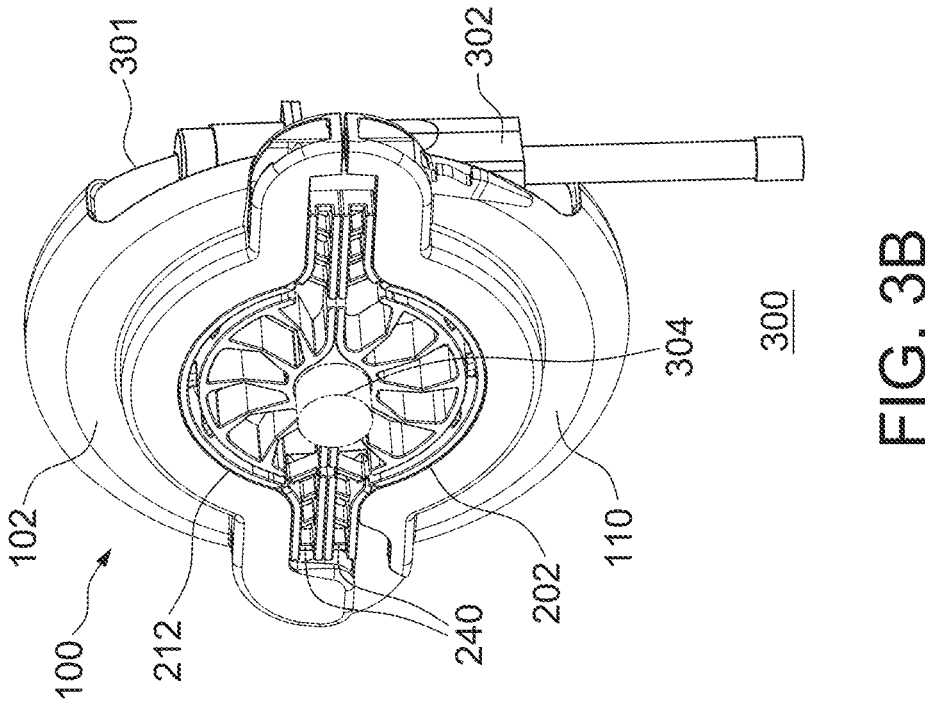
FIG. 3A illustrates a rear, left side perspective view of the exemplary positioning and retaining apparatus of FIG. 1A in use to position and retain a Rogowski coil, in accordance with another exemplary embodiment of the present disclosure.

In some embodiments, the first retaining apparatus member 102 and the second retaining apparatus member 110 are made of a hard insulating material. In some embodiments the first retention element 107 and the second retention element 117 are configured for retaining a Rogowski coil 301 as shown in the Rogowski coil assembly 300 of FIGS. 3A and 3B. A Rogowski coil 301 can further include its own Rogowski coil clamp 302. In some embodiments, the first retention element 107 and the second retention element 117 are configured to maintain a Rogowski coil 301 in a substantially circular configuration when the positioning and retaining apparatus 100 is in a closed position as shown in FIG. 3A.

In some embodiments, a positioning and retaining apparatus 100 includes a first retaining apparatus member 102 having a first retention element 107 and a hinge pin 106 that includes a flat section 127 on a radial portion 121 of the hinge pin 106 and a second retaining apparatus member 110 having a second retention element 117 and a hook-shaped element 112 arranged and constructed to engage with the hinge pin 106 and prevent the first retaining apparatus member 102 from separating from the second retaining apparatus member 110 in an open position, where the first retention element 107 and the second retention element 117 are configured to maintain a cable-styled device 301 in a substantially circular configuration when the positioning and retaining apparatus 300 is in a closed position. Note that although a Rogowski coil is shown in various examples herein, the embodiments are not limited to use with Rogowski coils. In some embodiments, the positioning and retaining apparatus 100 can further include a snap feature formed between the hook-shaped element 112 and the hinge pin 106, where the snap feature biases the first retaining apparatus member 102 and the second retaining apparatus member 110 together in a closed position upon rotation to a closed position between the first retaining apparatus member 102 and the second retaining apparatus member 110.

In some alternative embodiments, an insert apparatus 400, 500, 600, 700, 800 (with reference to all Figures) may include a pair of insert elements that are insertable into or attachable to the retaining apparatus members 102, 110 of the positioning and retaining apparatus 100. Each insert element may include a substantially arch-shaped base member 402, 412, 502, 512, 602, 702, 802, one or more pliable retention members 407, 507, 607, 707, 807, and one or more coupling members 403, 413, 503, 513, 603, 703, 803. The retention members (e.g., 407) extend radially from an inside surface of the base member (e.g., 402, 412) and are configured to engage objects of various geometries. The coupling members (e.g., 403, 413) extend from outside surfaces of the base members 402, 412 and are configured for retention by inner peripheries (e.g., insert slot channels 101, 111) of the retaining apparatus members 102, 110. For example, a coupling member 403, 413 may be sized and shaped for insertion into a respective slot channel 101, 111 defined by the retaining apparatus member 102, 110.

In some embodiments, the coupling member 403, 413, 503, 513, 603, 703, 803 is a flexible fin or spine going along the periphery of the substantially arch-shaped base member 402, 412, 502, 512, 602, 702, 802 or going for just a portion or portions of the periphery of the arch-shaped base member 402, 412, 502, 512, 602, 702, 802. In some embodiments, the retention members 407, 507, 607, 707, 807 are pliable or bendable to accommodate the bushings or transformer spade connectors or terminals of various geometries. In some embodiments, the insert apparatus 200, 400, 500 include modifiable radial members that include base member removable sections 240, 440, 540 to accommodate the bushings or transformer spade connectors or terminals of various geometries.

Figure 5:
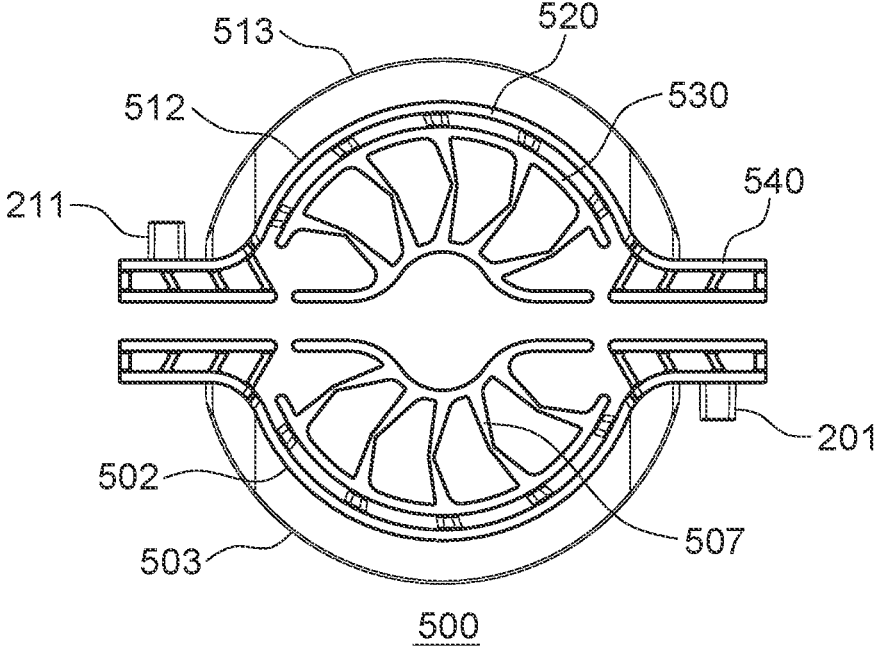
FIG. 5 illustrates a front plan view of the exemplary insert apparatus shown in FIG. 1A, in accordance with a further exemplary embodiment of the present disclosure.

In some embodiments as illustrated by the insert apparatus 500 of FIG. 5, the retention members 507 can include specific portions that either can bend, break, stretch, or otherwise be modified including a portion 520 which can typically fit or accommodate about a 1¼ inch (about 3.175 cm) diameter pipe, a portion 530 which can typically fit or accommodate pipes ranging from about ⅜-inch to about one inch in diameter (about 950 mm to about 2.54 cm in diameter), and a removable section 540 to accommodate the mounting of a transformer spade connector or terminal within the positioning and retaining apparatus 100 or between a coil clamp insert or inserts such as insert apparatus 500. Thus, a single insert apparatus 500 can accommodate about a ⅝-inch diameter (about 950 mm) bushing, about a 1¼ inch (about 3.175 cm) diameter bushing, or a transformer spade connector or terminal by removing the removable section 540 in the field. The same configuration can also accommodate about a two-inch (about 5.10 cm) diameter bushing, such as may be used in a three-phase padmount distribution transformer, by cutting the ribs or trusses of the retention member 507 in the field and/or alternatively accommodate a 60 mm aerial primary wire or conductor by once again cutting the ribs or trusses of the retention member 507 in the field. Other various sizes in accordance with the embodiments can be accommodated by accordingly varying the size of the clamp, the inserts, and/or ribs or trusses on the inserts as well as varying the sizes of the break-away or removable portions.

In some embodiments, the insert apparatus 200, 400, 500 further includes an alignment member 201, 211 or locating pin or stud 401, 411, 501, 511 enabling alignment between the insert apparatus 200, 400, 500 and the positioning and retaining apparatus 100.

Figure 4:
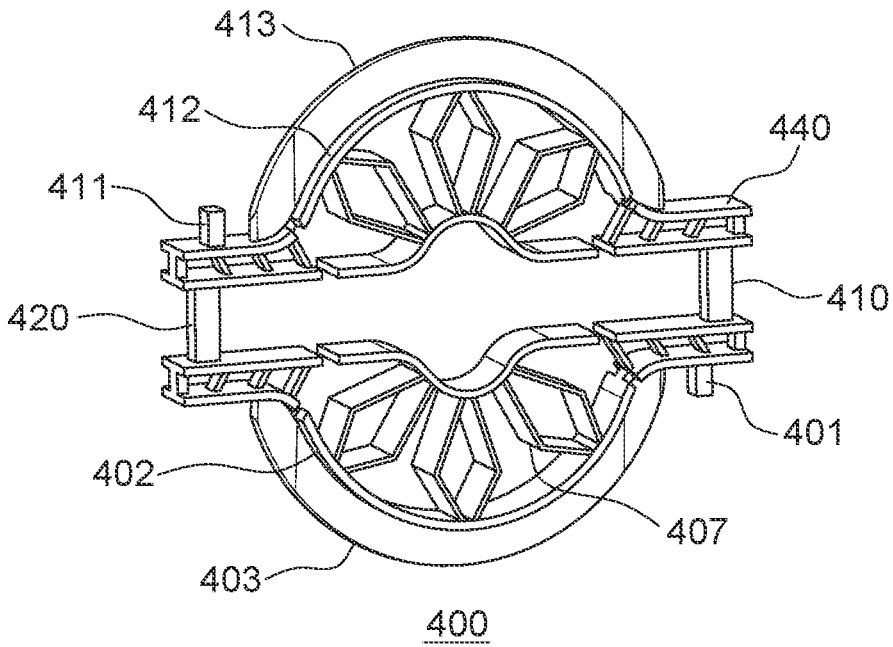
FIG. 4 illustrates a front perspective view of an insert apparatus for use with a positioning and retaining apparatus, in accordance with another exemplary embodiment of the present disclosure.
Figure 6:
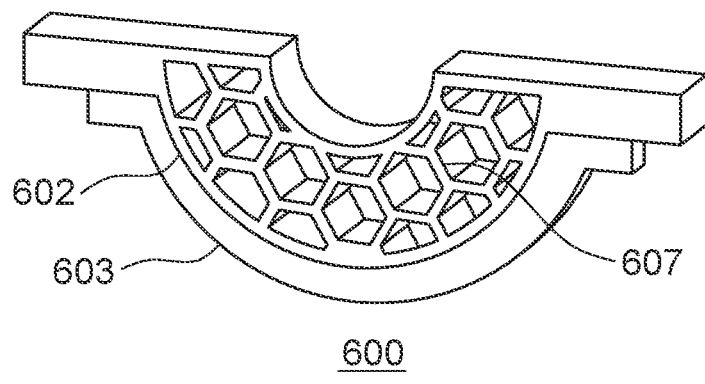
FIG. 6 illustrates a perspective view of another exemplary insert apparatus for use with a positioning and retaining apparatus, in accordance with the present disclosure.
Figure 7:
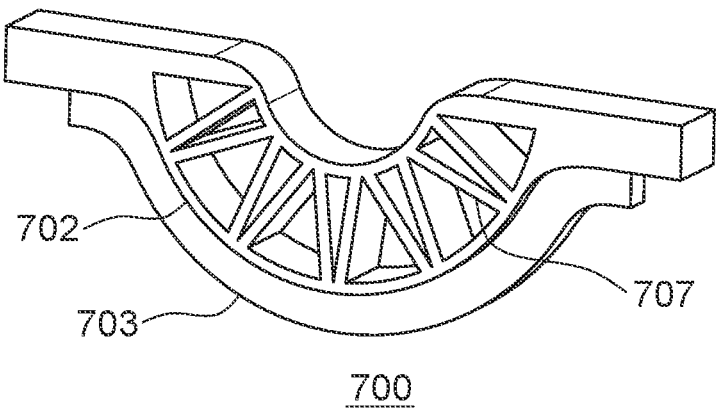
FIG. 7 illustrates a perspective view of a further exemplary insert apparatus for use with a positioning and retaining apparatus, in accordance with the present disclosure.
Figure 8:
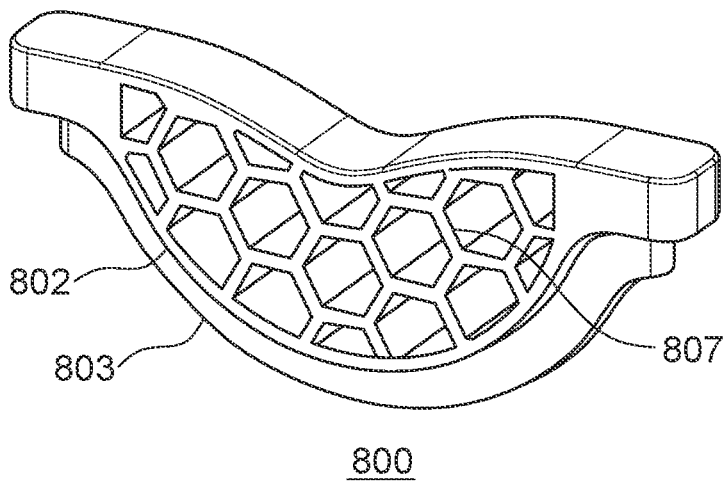
FIG. 8 illustrates a perspective view of yet another exemplary insert apparatus for use with a positioning and retaining apparatus, in accordance with the present disclosure.

In some embodiments as shown in FIG. 6 and FIG. 8, the retention members 607, 807 of the insert apparatus 600, 800 may be honeycomb shaped. In other embodiments as shown in FIG. 7, the retention members 707 of the insert apparatus 700 may be formed from a plurality of trusses. In further embodiments as shown in FIG. 2C and FIG. 5, the retention members 207, 507 may be formed from a plurality of bent trusses. In yet other embodiments as shown in FIG. 4, the retention members 407 may be formed from a plurality of diamond-shaped trusses.

In some embodiments, the retention members 207, 407, 507, 607, 707, 807 are formed from a pliable material selected from silicone or rubber. Other suitable pliable, bendable, or resilient materials (either alone or in certain combinations) can be used within contemplation of the embodiments. For example, the base members, retention members, coupling members, and/or removable members can be made using various techniques and materials using single shot and double shot molding or even 3-D printing techniques.

In some embodiments, a substantially arch-shaped base member 202, 402 alone or in combination with a second substantially arch-shaped base member 212, 412 forms a substantially circular insert apparatus 200, 400 configured for insertion in the positioning and retaining apparatus 100.

In some embodiments, an insert apparatus 200, 400, 500 includes a first modifiable member having a first retention fin and one or more modifiable radial members formed towards an inner central area of the first modifiable member and a second modifiable member having a second retention fin and one or more modifiable radial members formed towards an inner central area of the second modifiable member. In some embodiments, the first modifiable member and the second modifiable member are configured to cooperatively retain bushings or transformer spade connectors or terminals of various geometries when the first retention fin and the second retention fin are coupled to a positioning and retaining apparatus 100 and the positioning and retaining apparatus 100 is in a closed configuration.

In some embodiments a first modifiable radial member and the second modifiable radial member are pliable or bendable to accommodate the bushings or transformer spade connectors or terminals of various geometries. In yet other embodiments, the first modifiable radial member and the second modifiable radial member are break-away members to accommodate the bushings or transformer spade connectors or terminals of various geometries.

In some embodiments, an insert apparatus 200, 400, 500 further includes a locating pin or stud on one or both of the first modifiable radial member and the second modifiable radial member enabling alignment between the insert apparatus 200, 400, 500 and the positioning and retaining apparatus 100.

In some embodiments, the retention members 607, 807 are honeycomb shaped. In some embodiments, the retention members 207, 407, 507, 707 are formed from one or more of a plurality of trusses, a plurality of bent trusses, or a plurality of diamond-shaped trusses.

In some embodiments, the base members 202, 212, 402, 412, 502, 512 are formed from a pliable material selected from silicone or rubber. In some embodiments, the base members are substantially arch-shaped forming in combination a substantially circular insert configured for insertion in the positioning and retaining apparatus 100.

In some embodiments, an insert apparatus 200, 400, 500 includes a first substantially arch-shaped base member 202, 402, 502 having a first coupling member 203, 403, 503 on an outer periphery of the base member, a second substantially arch-shaped base member 212, 412, 512 having a second coupling member 213, 413, 513 on an outer periphery of the second base member, and one or more pliable retention members 207, 407 507 formed towards an inner central area of each of the base members. In some embodiments, the retention members are configured to cooperatively retain bushings or transformer spade connectors or terminals of various geometries when the coupling members are coupled to a positioning and retaining apparatus 100 and the positioning and retaining apparatus 100 is in a closed configuration.

Figure 3B:
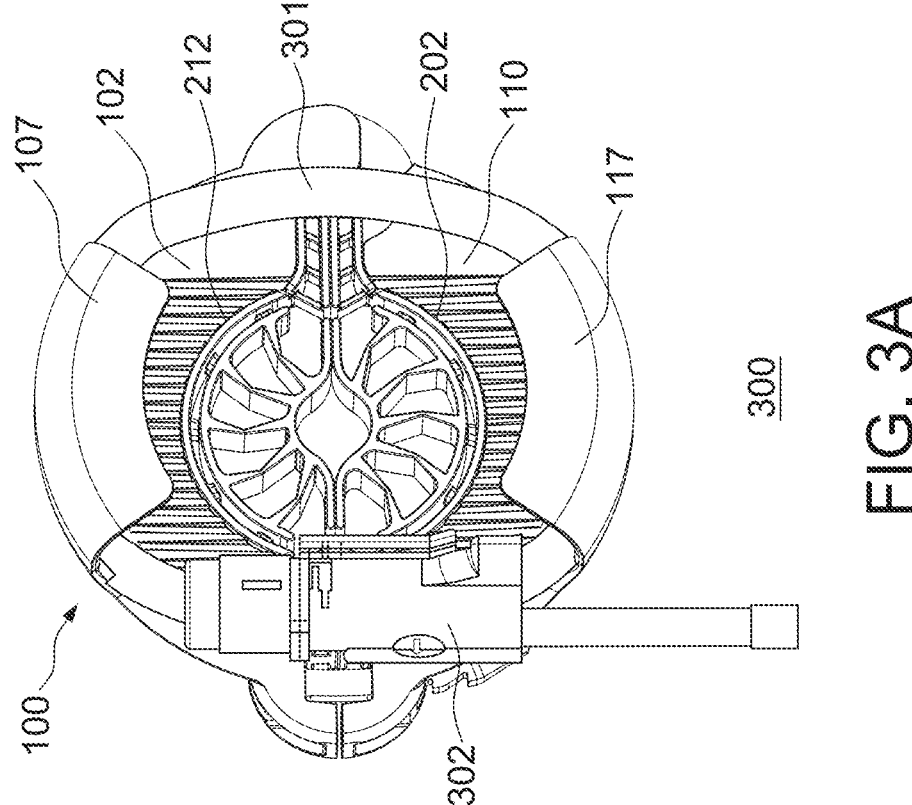
FIG. 3B illustrates a front, right side perspective view of the exemplary positioning and retaining apparatus of FIG. 1A in use to position and retain a Rogowski coil, in accordance with the exemplary embodiment illustrated in FIG. 3A.

In some embodiments, the insert apparatus 200 is formed as either two separate insert elements 260, 262 as shown in FIG. 1A, 3B, or 5 or as a single unit as shown in FIG. 4. With respect to FIG. 4, the base members 402, 412 may be coupled or connected together via connecting members 410, 420 to form a single piece during fabrication.

In the absence of any specific statement herein to the contrary, where the terms "substantially," "generally," or "about" are used as modifiers in the present disclosure and any appended claims (e.g., to modify a structure, a dimension, a measurement, or some other characteristic), it is understood that the characteristic may vary by up to 30 percent or that the characteristic may be included only partially. For example, an element that is substantially or generally hook-shaped is at least partially hook-shaped (e.g., includes a hook segment but may not necessarily be completely in the shape of a hook). Similarly, an element that is substantially or generally arch-shaped is at least partially arch-shaped (e.g., includes an arc segment but may not necessarily be completely arched). Further, an element that is substantially or generally pliable is at least partially pliable.

The terms "include" and "comprise" as well as derivatives thereof, in all their syntactic contexts, are to be construed without limitation in an open, inclusive sense, (e.g., "including, but not limited to"). The term "or," is inclusive, meaning "and/or." The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise"

and variations thereof, such as "comprises" and "comprising," are to be construed in an open, inclusive sense (e.g., "including, but not limited to").

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" or "in an exemplary embodiment" or "in some embodiments" and so forth in various places throughout this specification are not necessarily or likely all referring to the same embodiment. Furthermore, the particular features, structures, or characteristics disclosed herein may be combined in any suitable manner in one or more embodiments.

As used in this specification and the appended claims, the singular forms "a," "an," and "the" include plural referents unless the content and context clearly dictate otherwise. It should also be noted that the conjunctive terms, "and" and "or" are generally employed in the broadest sense to include "and/or" unless the content and context clearly dictate inclusivity or exclusivity, as the case may be. In addition, the composition of "and" and "or" when recited herein as "and/or" is intended to encompass an embodiment that includes all the associated items or elements and one or more other alternative embodiments that include fewer than all of the associated items or elements.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

Except as the context may dictate otherwise, the singular shall mean the plural and vice versa within this disclosure. All pronouns shall mean and include the person, entity, firm, object, component, or element to which they relate. Also, the masculine shall mean the feminine and vice versa.

The various embodiments described above can be combined to provide further embodiments. Additionally, aspects of the disclosed embodiments can be modified, if necessary, to employ concepts and embodiments disclosed in various patents, published applications, and other publications to provide further embodiments.

What is claimed is:

1. An apparatus for positioning and retaining a cable-styled device around an object, the apparatus comprising:
   a first member including a hinge element that includes a pair of hinge arms defining an opening proximate a first end of the first member, a hinge pin positioned within the opening and between the hinge arms, and a first retention element configured to receive a first section of the cable-styled device; and
   a second member including a generally hook-shaped element positioned at a first end of the second member and a second retention element configured to receive a second section of the cable-styled device, the hook-shaped element engaging the hinge pin within the opening of the hinge element and being constructed to maintain engagement with the hinge pin when the first member and the second member are in an open position relative to each other.

2. The apparatus of claim 1, wherein the hook-shaped element includes a protrusion in a direction toward the hinge pin to enable the hook-shaped element to maintain engagement with the hinge pin when the first member and the second member are in the open position.

3. The apparatus of claim 2, wherein the hinge pin includes a first substantially flat section on a radial portion thereof, wherein the hook-shaped element includes a second substantially flat section on an inner radial portion thereof adjacent the protrusion, and wherein the first substantially flat section and the second substantially flat section enable a one-way engagement of the hook-shaped element with the hinge pin.

4. The apparatus of claim 1, wherein the hook-shaped element defines a gap that receives the hinge pin.

5. The apparatus of claim 1, further comprising:

a pliable, non-conductive securing structure configured to engage the object and retain the first member and the second member in fixed positions relative to the object and to each other when the first member and the second member are in a closed position relative to each other.

6. The apparatus of claim 5, wherein the securing structure includes:

a first insert element configured to engage the object and retain the first member in a fixed position relative to the object, at least a portion of the first insert element being positioned in a first insert channel defined by the first member; and a second insert element configured to engage the object and retain the second member in a fixed position relative to the object, at least a portion of the second insert element being positioned in a second insert channel defined by the second member.

7. The apparatus of claim 5, wherein the securing structure has sufficient flexibility to accommodate and retain the first member and the second member in fixed positions relative to the object irrespective of a geometry of the object.

8. The apparatus of claim 1, further comprising:

an adjustable fastening mechanism formed collectively by the first member and the second member proximate a second end of the first member and a second end of the second member to retain the first member and the second member in a closed position around the object.

9. The apparatus of claim 8, wherein the adjustable fastening mechanism is a ratchet-style clamping mechanism.

10. The apparatus of claim 1, wherein the cable-styled device is a Rogowski coil and wherein the object is a transformer bushing or a transformer spade terminal.

11. The apparatus of claim 1, wherein the first member and the second member are non-conductive.

12. The apparatus of claim 1, wherein the first retention element and the second retention element are non-conductive.

13. An apparatus for positioning and retaining a cable-styled device around an object, the apparatus comprising:

a first member including a hinge element that includes a pair of hinge arms defining an opening proximate a first end of the first member, a hinge pin positioned within the opening and between the hinge arms, and a first retention element configured to receive a first section of the cable-styled device;

a second member including a generally hook-shaped element positioned at a first end of the second member and a second retention element configured to receive a second section of the cable-styled device, the hook-shaped element engaging the hinge pin within the opening of the hinge element and being constructed to maintain engagement with the hinge pin when the first member and the second member are in an open position; and a securing structure configured to engage the object and retain the first member and the second member in fixed positions relative to the object and to each other when the first member and the second member are in a closed position.

14. The apparatus of claim 13, wherein the securing structure includes:

a first pliable, non-conductive insert element configured to engage the object and retain the first member in a fixed position relative to the object, at least a portion of the first insert element being positioned in a first insert channel defined by the first member; and a second pliable, non-conductive insert element configured to engage the object and retain the second member in a fixed position relative to the object, at least a portion of the second insert element being positioned in a second insert channel defined by the second member.

15. The apparatus of claim 13, wherein the securing structure has sufficient flexibility to accommodate and retain the first member and the second member in fixed positions relative to the object irrespective of a geometry of the object.

16. The apparatus of claim 13, wherein the hook-shaped element includes a protrusion in a direction toward the hinge pin to enable the hook-shaped element to maintain engagement with the hinge pin when the first member and the second member are in the open position.

17. The apparatus of claim 16, wherein the hinge pin includes a first substantially flat section on a radial portion thereof, wherein the hook-shaped element includes a second substantially flat section adjacent the protrusion, and wherein the first substantially flat section and the second substantially flat section enable a one-way engagement of the hook-shaped element with the hinge pin.

18. The apparatus of claim 13, wherein the first member and the second member are non-conductive.

19. The apparatus of claim 13, further comprising:

an adjustable fastening mechanism formed collectively by the first member and the second member proximate a second end of the first member and a second end of the second member to retain the first member and the second member in the closed position.

20. An apparatus for positioning and retaining a cable-styled device around an object, the apparatus comprising:

a first member including a hinge element defining an opening proximate a first end of the first member, a hinge pin positioned within the opening, and a first retention element configured to receive a first section of the cable-styled device;

a second member including a generally hook-shaped element positioned at a first end of the second member and a second retention element configured to receive a second section of the cable-styled device, the hook-shaped element being positioned within the opening of the hinge element and defining a gap that receives the hinge pin, the first member and the second member being movable relative to each other, the hooked-shaped element and the hinge pin being shaped to prevent the hooked-shaped element from separating from the hinge pin when the first member and the second member are in an open position relative to each other;

a first pliable insert element configured to engage the object and retain the first member in a fixed position relative to the object, at least a portion of the first insert element being positioned in a first insert channel of the first member; and a second pliable insert element configured to engage the object and retain the second member in a fixed position relative to the object, at least a portion of the second insert element being positioned in a second insert channel of the second member.

* * * * *